(12) United States Patent
Varale

(10) Patent No.: US 11,183,826 B2
(45) Date of Patent: Nov. 23, 2021

(54) CLAMP FOR MOUNTING CABLES TO A SUPPORTING ELEMENT

(71) Applicant: Fi.Mo.Tec. S.p.A., Milan (IT)

(72) Inventor: Alberto Varale, Cologno Monzese (IT)

( * ) Notice: Subject to any disclaimer, the term of this patent is extended or adjusted under 35 U.S.C. 154(b) by 0 days.

(21) Appl. No.: 16/792,299

(22) Filed: Feb. 17, 2020

(65) Prior Publication Data

US 2021/0111546 A1 Apr. 15, 2021

(30) Foreign Application Priority Data

Oct. 10, 2019 (IT) .................... 102019000018416

(51) Int. Cl.
| | |
|---|---|
| *F16B 2/06* | (2006.01) |
| *F16B 2/04* | (2006.01) |
| *H02G 3/32* | (2006.01) |
| *F16L 3/10* | (2006.01) |
| *F16L 3/24* | (2006.01) |
| *F16B 31/02* | (2006.01) |
| *F16B 37/04* | (2006.01) |

(52) U.S. Cl.
CPC ............ *H02G 3/32* (2013.01); *F16B 2/065* (2013.01); *F16L 3/1033* (2013.01); *F16B 2/04* (2013.01); *F16B 31/021* (2013.01); *F16B 37/044* (2013.01); *F16L 3/24* (2013.01)

(58) Field of Classification Search
CPC ... H02G 3/32; F16B 2/065; F16B 2/04; F16B 31/021; F16L 3/1033; F16L 3/24
See application file for complete search history.

(56) References Cited

U.S. PATENT DOCUMENTS

| | | | |
|---|---|---|---|
| 2,649,884 A | 8/1953 | Westover | |
| 3,146,982 A | 9/1964 | Budnick | |
| 3,341,909 A * | 9/1967 | Havener | ................. B25B 5/101 |
| | | | 24/486 |
| D242,113 S * | 11/1976 | Mooney | ......................... D8/394 |
| 6,257,530 B1* | 7/2001 | Tsai | ......................... F16L 3/127 |
| | | | 248/73 |
| D767,983 S * | 10/2016 | Jiang | ............................. D8/394 |
| 2006/0065805 A1* | 3/2006 | Barton | .................... F16B 2/065 |
| | | | 248/317 |
| 2013/0020447 A1* | 1/2013 | Heath | ..................... F16B 2/065 |
| | | | 248/58 |
| 2014/0013577 A1* | 1/2014 | Heath | ....................... F16B 2/06 |
| | | | 29/525.01 |

(Continued)

FOREIGN PATENT DOCUMENTS

| | | |
|---|---|---|
| EP | 2048375 A2 | 4/2009 |
| FR | 2400130 | 3/1979 |

(Continued)

OTHER PUBLICATIONS

Italian Patent Office, Search Report, dated May 13, 2020 A relevant portion is in English.

*Primary Examiner* — Tan Le

(74) *Attorney, Agent, or Firm* — Themis Law

(57) ABSTRACT

A clamp for mounting cables to a supporting element includes a jumper having a "C"-shaped cross-section with two opposite wings interconnected by a core, the two wings and the core being provided with respective pass-through holes. At least one of those pass-through holes is provided in combination with an insert or an adapter having a threaded pass-through hole.

20 Claims, 9 Drawing Sheets

(56) References Cited

U.S. PATENT DOCUMENTS

2015/0136473 A1* 5/2015 Jafari ................... H02G 3/0691
                                                            174/656
2020/0321763 A1* 10/2020 Joshi ......................... F16B 2/12

FOREIGN PATENT DOCUMENTS

FR           2740183 A1    4/1997
JP           H01173220 U  12/1989

* cited by examiner

CLAMP FOR MOUNTING CABLES TO A SUPPORTING ELEMENT

FIELD OF THE INVENTION

The present invention relates to an improved clamp for mounting cables, for example coaxial cables, optical-fiber cables or power cables, to a supporting element, for example a segment of a pylon.

For this purpose, clamps consisting of a metal jumper having a C-shaped cross-section with two opposed wings rigidly interlocked by a core are known.

The seats of the cables, commonly called collars or saddles, are bolted externally to one of the two wings, or to the core of the "C", whereas the clamp is bolted to the supporting element by means of a blocking screw, which is positioned between the wings of the clamp itself.

An example of said saddles and clamps is described in documents WO2017/060199 and WO2019/145830.

The known steel clamps are provided with a threaded hole for housing the blocking screw and two larger holes, not threaded, for the installation of quick-coupling collars for supporting long-shaped articles, in particular cables, tubes and/or the like, or the known steel clamps are provided with three threaded holes, one of which for blocking on the supporting element, and the other two for the installation of saddles by means of a threaded bar.

Clamps made of plastic are also known, whose manufacturing involves the use of a mould that is not easy to produce and which is expensive.

The negative impact of the passive intermodulation, or PIM (Passive Inter-Modulation) phenomenon on the infrastructure of mobile radio networks, is also known. Substantially passive intermodulation takes place when multiple radio frequency signals, coming from one or more radio base stations, mix together in a site that houses a cell, giving rise to a signal that contains a new set of frequencies.

Undesired signals due to passive intermodulation are generated due to some form of mechanical non-linearity. One of the major causes is the inconsistency of the contacts between metal and metal in the areas affected by high current intensities, such as those inside the transmission lines or within the radio-frequency (RF) components. This may be due to the imperfect preparation of the RF terminations or from non-optimal assembly procedures, the loosening of screws or rivets inside the RF components, contaminated or oxidized surfaces of the connectors or from inadequately tightened RF connectors.

Passive intermodulation can therefore potentially significantly degrade the service quality of new networks, such as Lte (Long Term Evolution) and Hdspa+(High Speed Downlink Packet Access), and it is of primary importance for telecommunications operators to reduce the negative effects of passive intermodulation in order to be able to install more advanced network infrastructures capable of supporting the conveying of broadband data, without significantly increasing costs and without jeopardizing the performance level.

SUMMARY OF THE INVENTION

The objective of the present invention is to provide an improved clamp for the mounting of cables capable of solving the negative impact of the passive intermodulation or PIM (Passive Inter-Modulation) phenomenon.

A further object of the invention is to provide a clamp for mounting cables to a supporting element, which is sturdy and durable.

Another objective of the invention is to provide a clamp which is very simple and economical to produce, light, and not subject to rapid wear due to atmospheric agents.

The above objectives are achieved by a clamp having the characteristics set forth herein.

BRIEF DESCRIPTION OF THE DRAWINGS

The structural and functional characteristics of the present invention and its advantages with respect to the known art will be even more apparent from an examination of the following description, referring to the attached drawings, which illustrate examples of possible embodiments of the clamp itself. In the drawings:

FIG. 7 illustrates a perspective view of the clamp object of the present invention on which a quick-coupling collar is mounted for supporting long-shaped articles, in particular cables, tubes and/or the like;

FIG. 10 illustrates a perspective view of the clamp object of the present invention with three threaded inserts mounted on a profile and with two quick-coupling collars for supporting long-shaped articles, in particular cables, tubes and/or the like;

DETAILED DESCRIPTION OF EMBODIMENTS OF THE INVENTION

Figure 1:
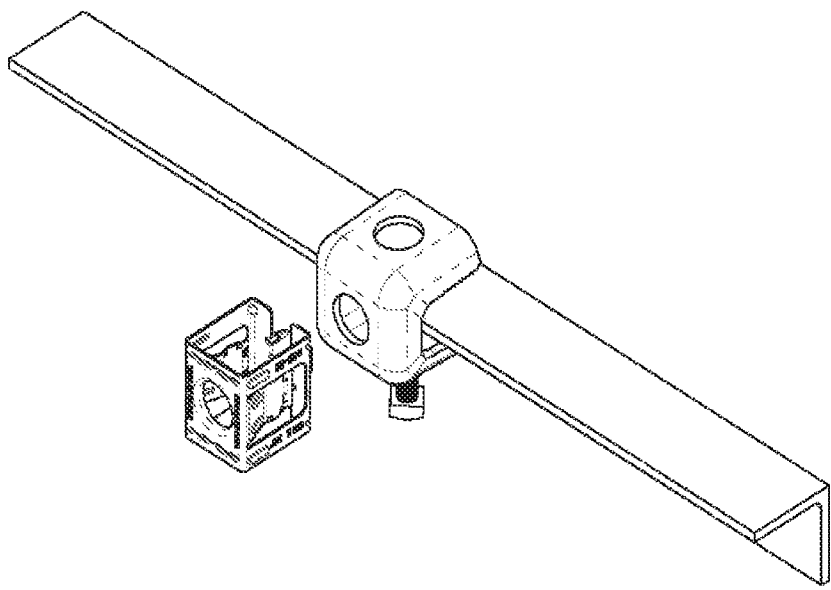
FIGS. 1 and 2 are two perspective views illustrating a clamp according to the known art.
Figure 2:
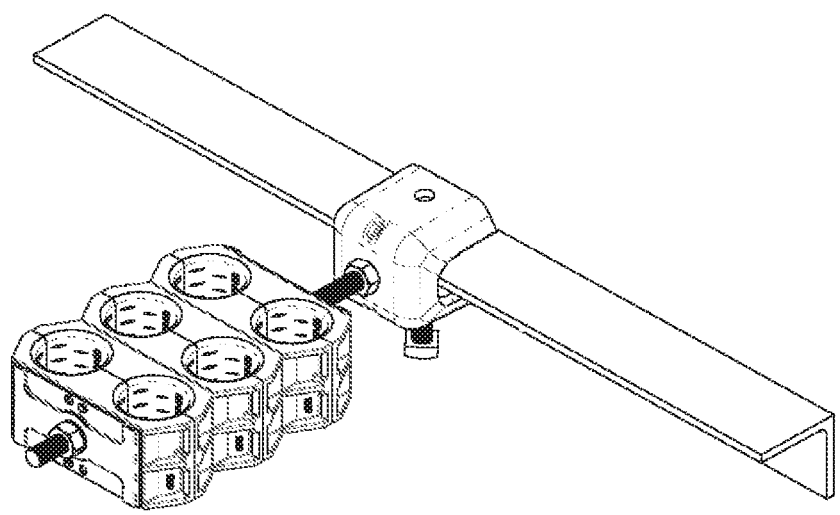

With reference to FIGS. 1 and 2 of the drawings, these illustrate a clamp according to the prior art: in particular in FIG. 1 the clamp is provided with a threaded hole for housing the blocking screw and two larger holes, not threaded, for the installation of quick-coupling collars for supporting long-shaped articles, in particular cables, tubes and/or the like whereas FIG. 2 shows a clamp with three threaded holes, of which one, on the wing opposite the wing provided with toothing, for blockage on the supporting element by means of a blocking screw, and the other two for installing saddles by means of a threaded bar.

As illustrated in FIGS. 3a-3c, the clamp of the invention is indicated as a whole with 1 and is structurally composed of a jumper having a "C"-shaped cross-section, with two opposing wings 11, 21 interconnected by a core 31.

Said wings 11, 21 and said core 31 are provided with respective pass-through holes 11', 21' and 31' and at least one of said pass-through holes 11', 21', 31' is provided in combination with an insert or adapter 2 having a threaded pass-through hole 22.

Said pass-through holes 11', 21', 31' are in fact capable of accommodating a respective insert or adapter 2 with a threaded pass-through hole 22 or the coupling elements of a supporting collar 4 for cables, tubes or the like.

One or both of the wings 11, 21 are provided with sections 111, 211, folded, from the edge of said wings 11, 21, at 90° towards the inside of the "C"-shaped section of said clamp 1.

Said sections 111, 211 are interconnected by sections 311 of the core 31, also folded, from the side edge of said core 31, at 90° towards the inside of the "C"-shaped section of said clamp 1, said sections act as reinforcement of the clamp 1, preventing the wings 11, 21 from opening both inwardly and outwardly.

The sections 311, 211, 111 of the wings 11, 21 and of the core form a stiffening chain of the clamp 1.

In order to improve the rigidity of the clamp 1, connection ribs 42 of said wings 11, 21 with said core 31 can be provided on the inner surface of the wings 11, 21 and of the core 31.

As clearly illustrated in the figures, the clamp 1 provided with seats 3 (so-called saddles, FIG. 9) for the passage of cables (not shown) or with quick-coupling collars 4 (FIGS. 7, 10, 11), is fixed to a support, for example a plate supporting element 5 of a pylon (not shown).

Figure 9:
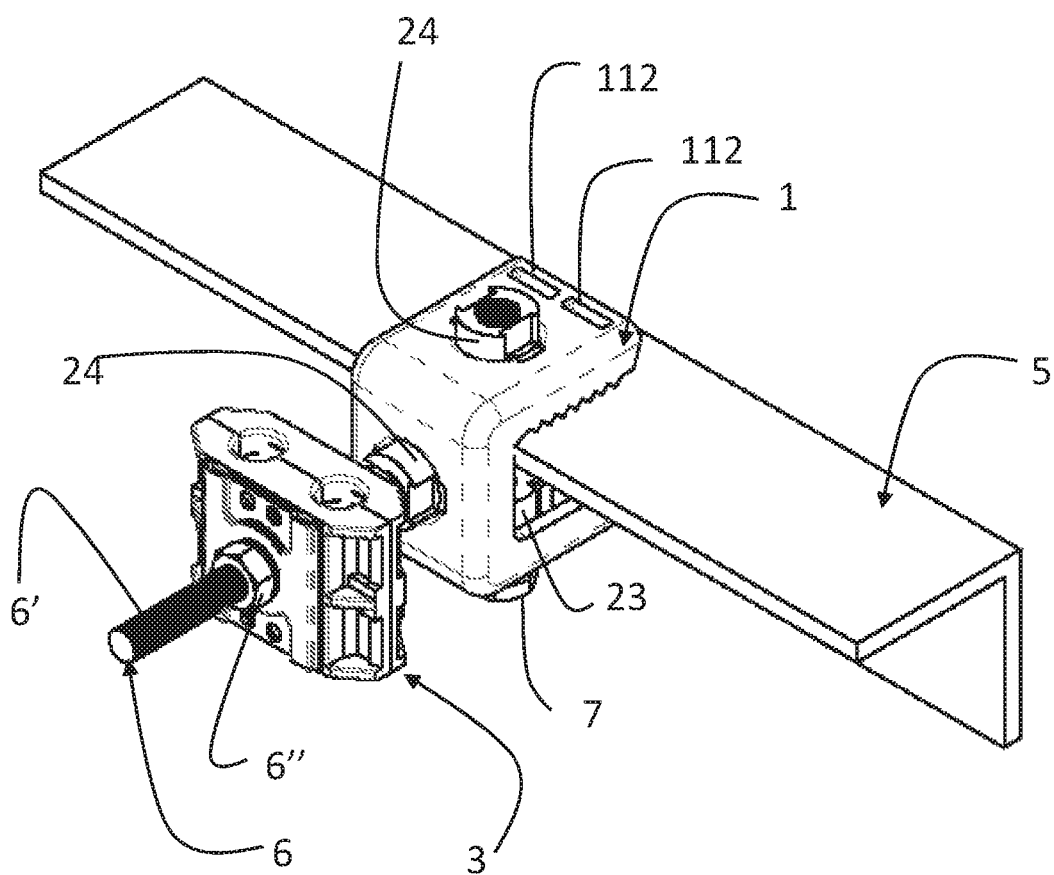
FIG. 9 illustrates a perspective view of the clamp object of the present invention with three threaded inserts mounted on a profile and with a pair of saddles for supporting long-shaped articles, in particular cables, tubes and/or the like joined together by means of a threading rod.
Figure 10:
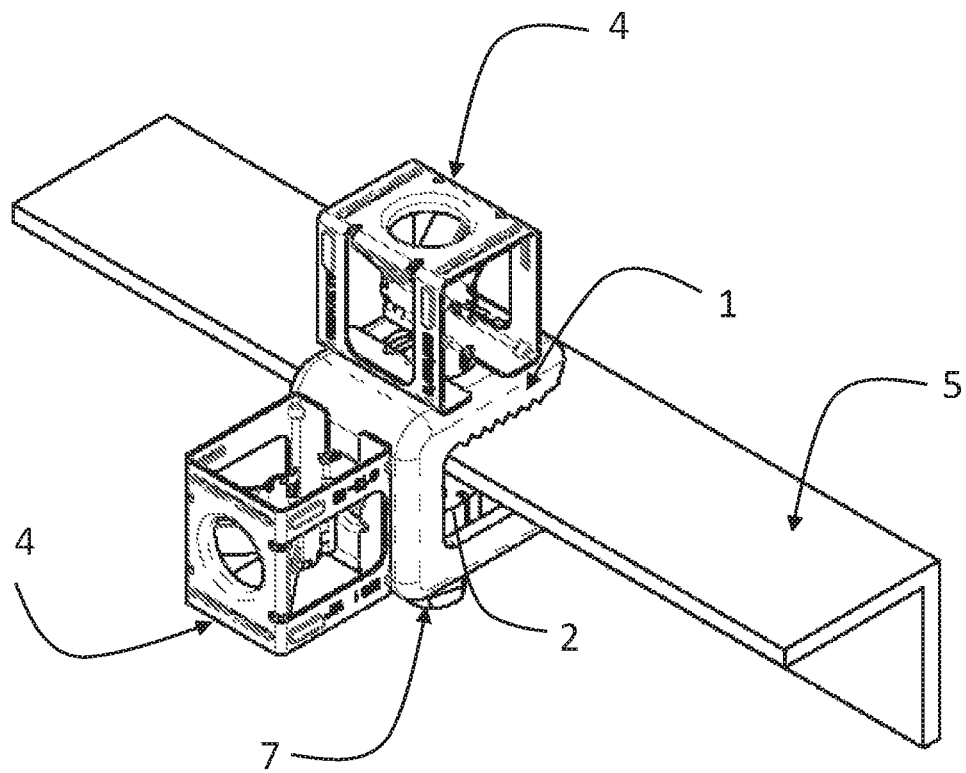
Figure 11:
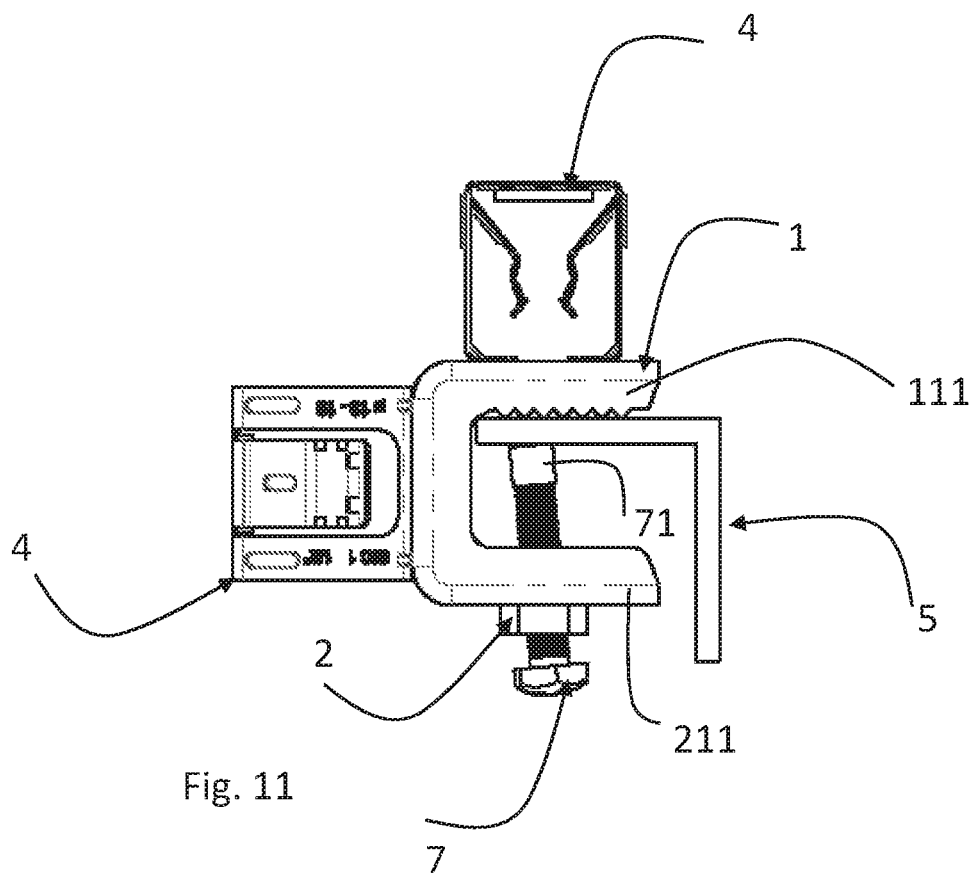
FIG. 11 illustrates a side view of the clamp of FIG. 10 in which the blocking screw is provided with a plastic cap.

The saddles 3 or collars 4 for cables can be fixed either to one of the wings 11, 21 of the clamp 1 as illustrated in FIGS. 10 and 11, and/or to the core 31, as in the example of FIGS. 7, 9, 10, 11.

Figure 8:
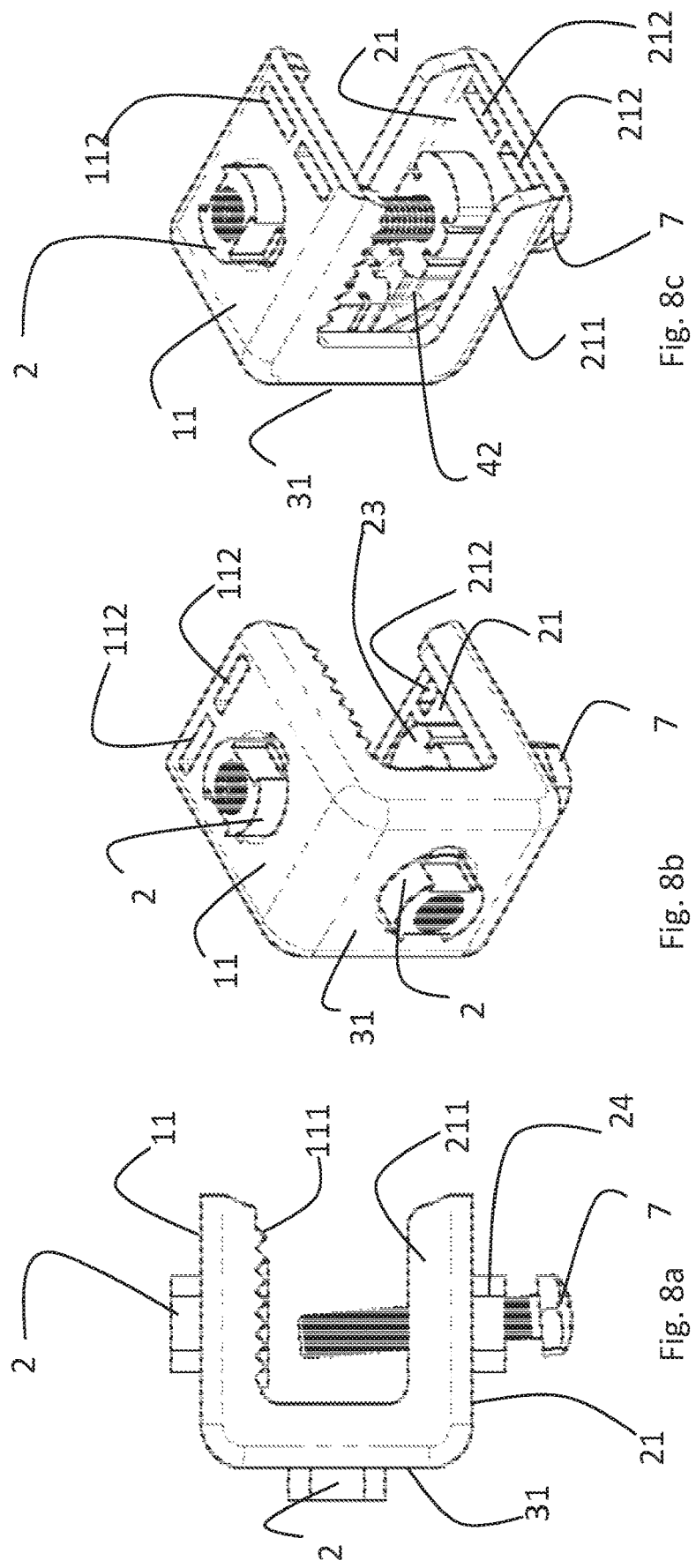
FIGS. 8a-8c illustrate different views of a clamp produced according to the present invention in which the threaded insert (adapter) is mounted in all three holes of the clamp body.

As illustrated in FIG. 8, the seats/saddles 3 are fixed by means of a bolt (threaded rod/nut) 6 passing through the threaded pass-through hole 22 of the insert or adapter 2. The threaded rod is indicated with 6' and the nut with 6".

As illustrated in the figures, according to an embodiment of the present invention, the clamp 1 is fixed to a supporting plate 5 by means of a screw 7 screwed into the threaded hole of the insert or adapter 2 of the wing 11 or 21 so that one end of said screw is in contact with the support 5 inserted in the jumper having a "C"-shaped cross-section of said clamp.

According to an embodiment illustrated in FIG. 11, the end of the screw 7 destined for coming into contact with the plate-like support 5 is covered with plastic or has a cap made of plastic material 71, for preventing contact between the metal with which the screw 7 is made and the metal with which the supporting plate 5 is made, inserted in the jumper having a "C"-shaped cross-section of said clamp.

In order to increase the grip of the clamp 1 on the plate 5, the profile of the folded sections 111, 211 of one or both of the wings 11, 21 is notched.

As shown in FIGS. 6, 8*a*-8*c*, 9, 10 and 11, the screw 7 is preferably inserted in the insert or adapter 2 positioned in the hole 11', 21' of the wing 11, 21 opposite the section 111, 211 with a notched profile.

The screw 7 can be substituted by a bolt (screw/nut) which cooperates with a thrust plate that can be moved on the sides of the core 31 (embodiment not shown).

According to a further embodiment, the clamp 1 is blocked on a support, inserted in the jumper having a "C"-shaped cross section of said clamp, for example a tubular support, by means of cable ties.

FIGS. 3*b*, 3*c*, 7, 8*b*, 8*c*, 9 show a clamp 1 in which the wings 11, 21 have one or more slots 112, 212 for the passage of said cable ties (not shown).

Said cable ties are provided as an alternative to the blocking screw 7.

As illustrated in FIGS. 4*a*-4*h*, the insert or adapter 2 with a threaded pass-through hole 22 object of the present invention comprises a substantially rectangular base section 23 with long straight sides 23' and short arched sides 23", a bush section 24 extending from said base section 23.

In the mounted condition of said insert or adapter 2 in at least one of said pass-through holes 11', 21', 31', said base section 23 is abutted against the internal surface S of the jumper having a "C"-shaped cross-section and the bush section 24 is at least partially inserted in the respective pass-through hole 11', 21', 31'.

Respective elastically yielding teeth 232 extend from the straight long sides 23' of said base section 23 in the direction of the bush section 24, which are snap-engaged in respective undercuts 41 of the pass-through holes 11', 21' and 31' of the wings 11, 21 and of the core 31 of the clamp 1.

At least one of the short arched sides 23" of the base section 23 is provided with at least one longitudinal recess 233, which extends for at least part of said arched side 23" in the direction of the bush section 24, at least one rib 42 provided on the inner face S of the wing 11, 21 and/or of the core 31 in correspondence with the corresponding pass-through hole 11', 21', 31' being engaged in the at least one longitudinal recess 233 so as to prevent the insert or adapter 2 with a threaded pass-through hole 22 from rotating with respect to the clamp 1.

Figure 6:
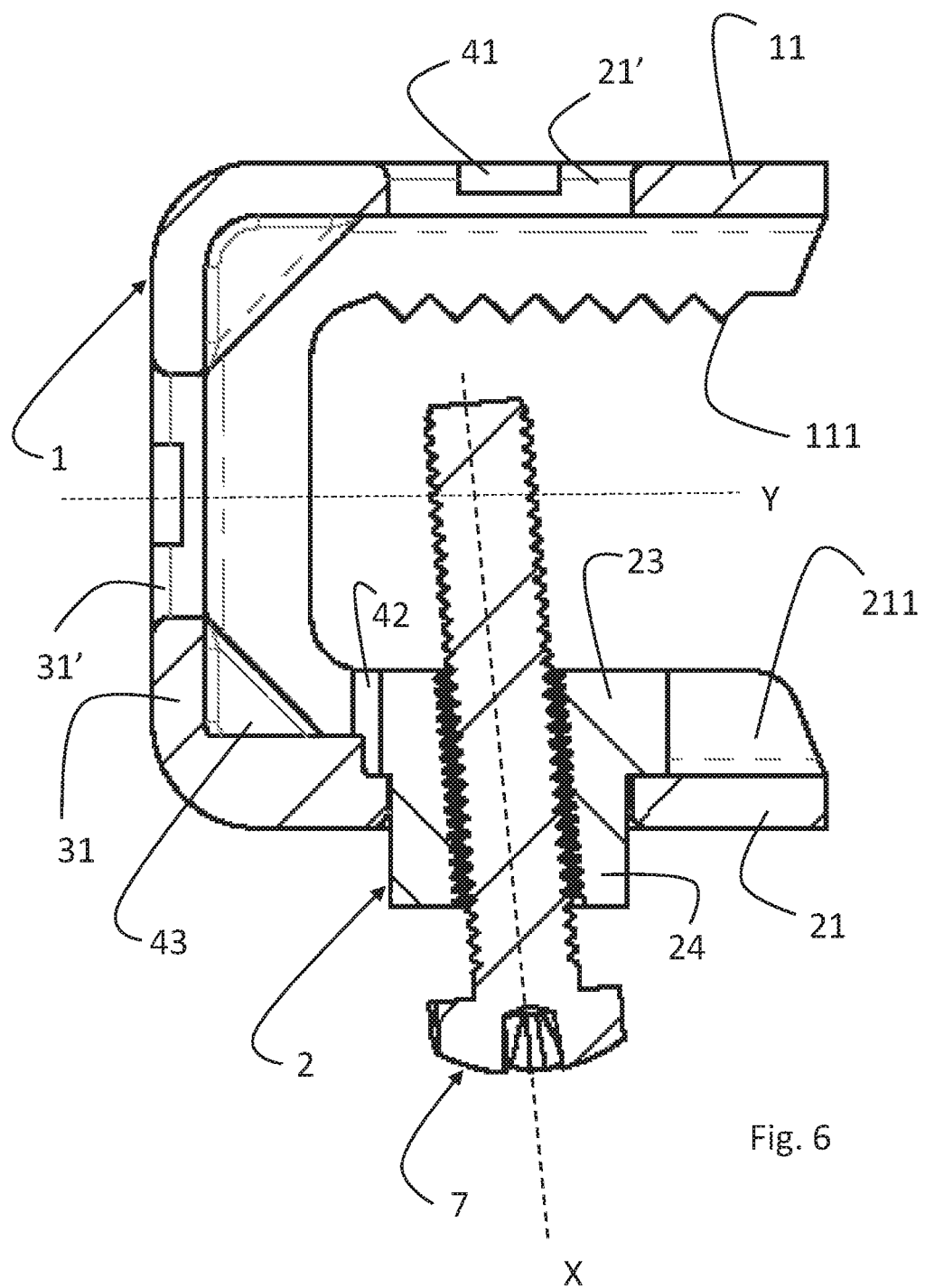
FIG. 6 is a side view in vertical section of the clamp object of the present invention with the blocking screw.

According to a further embodiment illustrated in FIG. 6, the threaded pass-through hole 22 of the insert or adapter 2 inserted in the pass-through hole 11', 21' provided on the wings 11, 21 is tilted, i.e. the axis X passing through said threaded hole 22 is not perpendicular to the axis Y passing through the hole 31' provided on the core 31 but is tilted towards said core 31 to improve the blocking of the clamp 1 on the support 5 by means of the screw 7.

Figure 3:
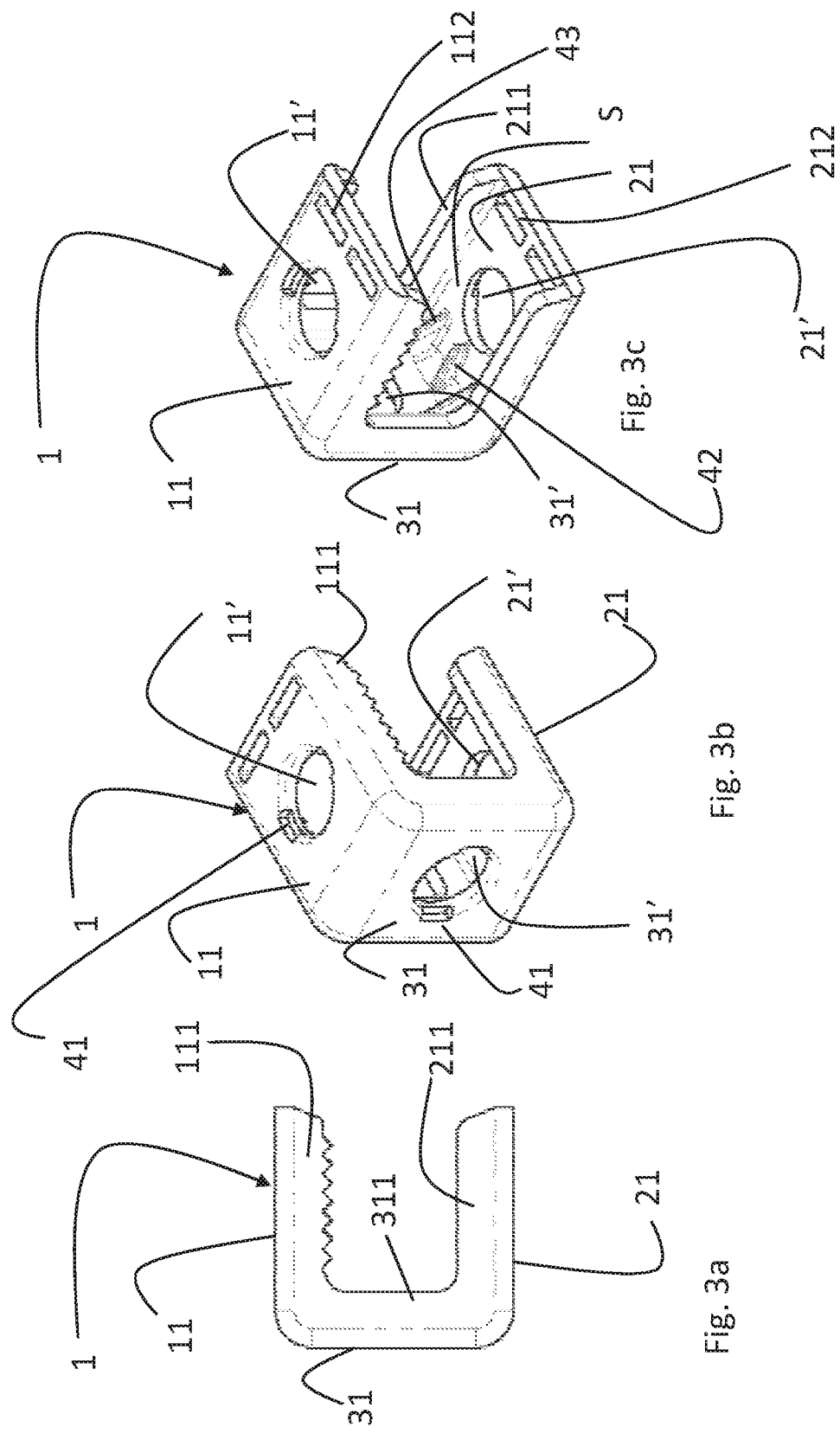
FIGS. 3a-3c are views of the body of the clamp according to the present invention.
Figure 4:
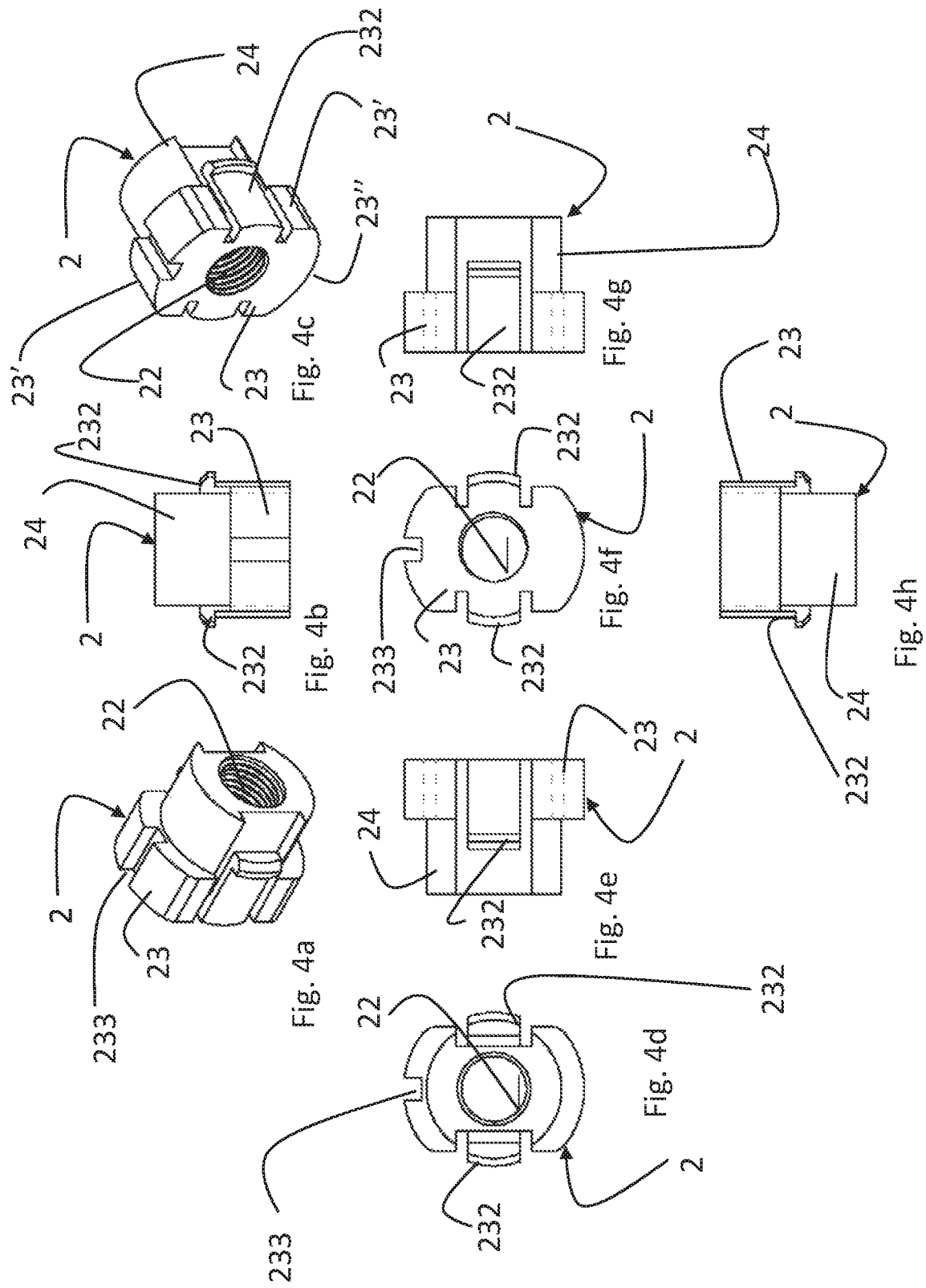
FIGS. 4a-4h are views of the threaded insert (adapter) of the clamp according to the present invention.
Figure 5:
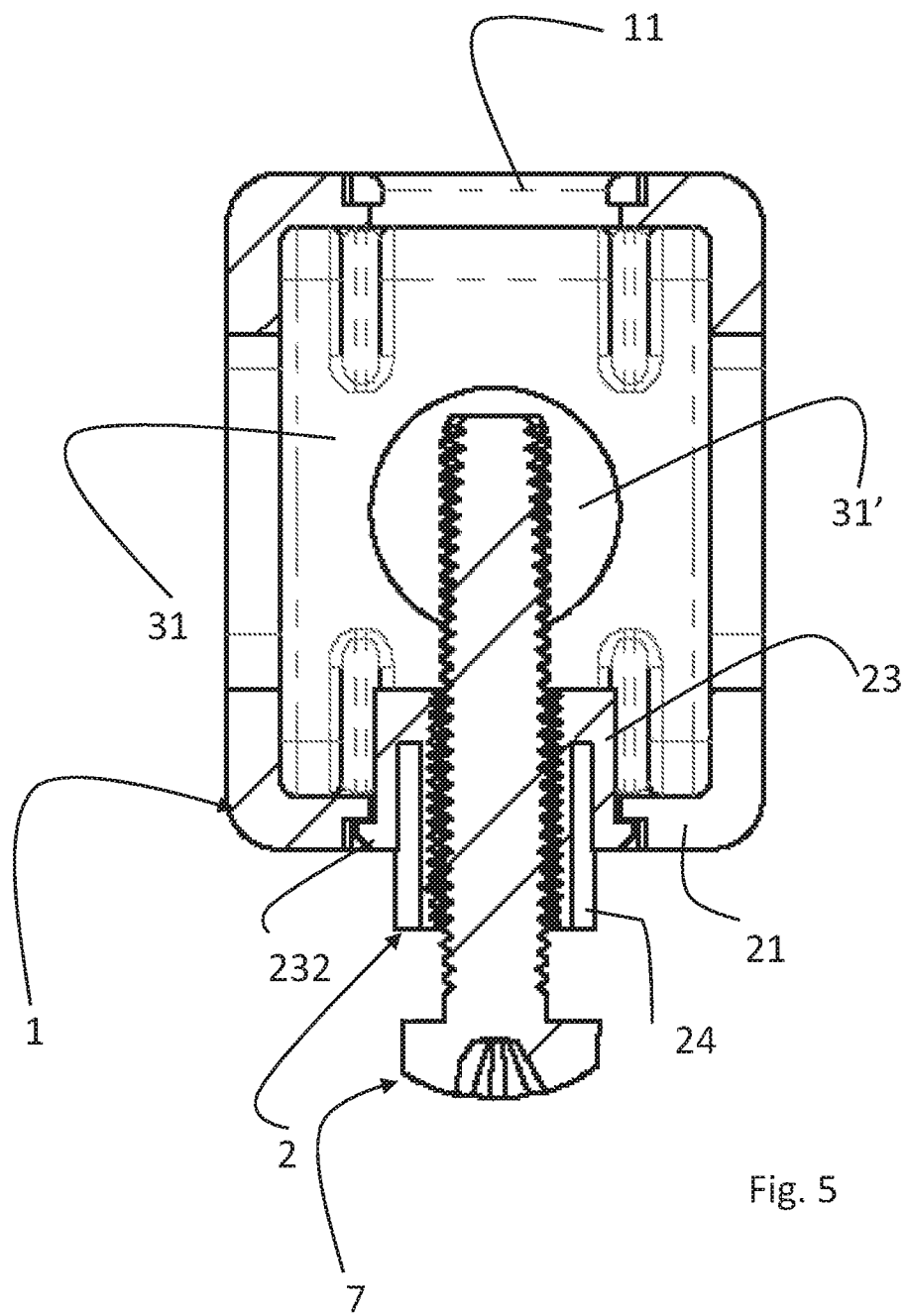
FIG. 5 shows a front view in vertical section of the clamp object of the present invention with the blocking screw.

As illustrated for example in FIG. 3, the wing of the clamp 1 opposite the wing having a folded section with a notched profile is provided with the insert or adapter 2 in whose threaded pass-through hole 22 the blocking screw 7 of said clamp is inserted on the plate 5.

Figure 7:
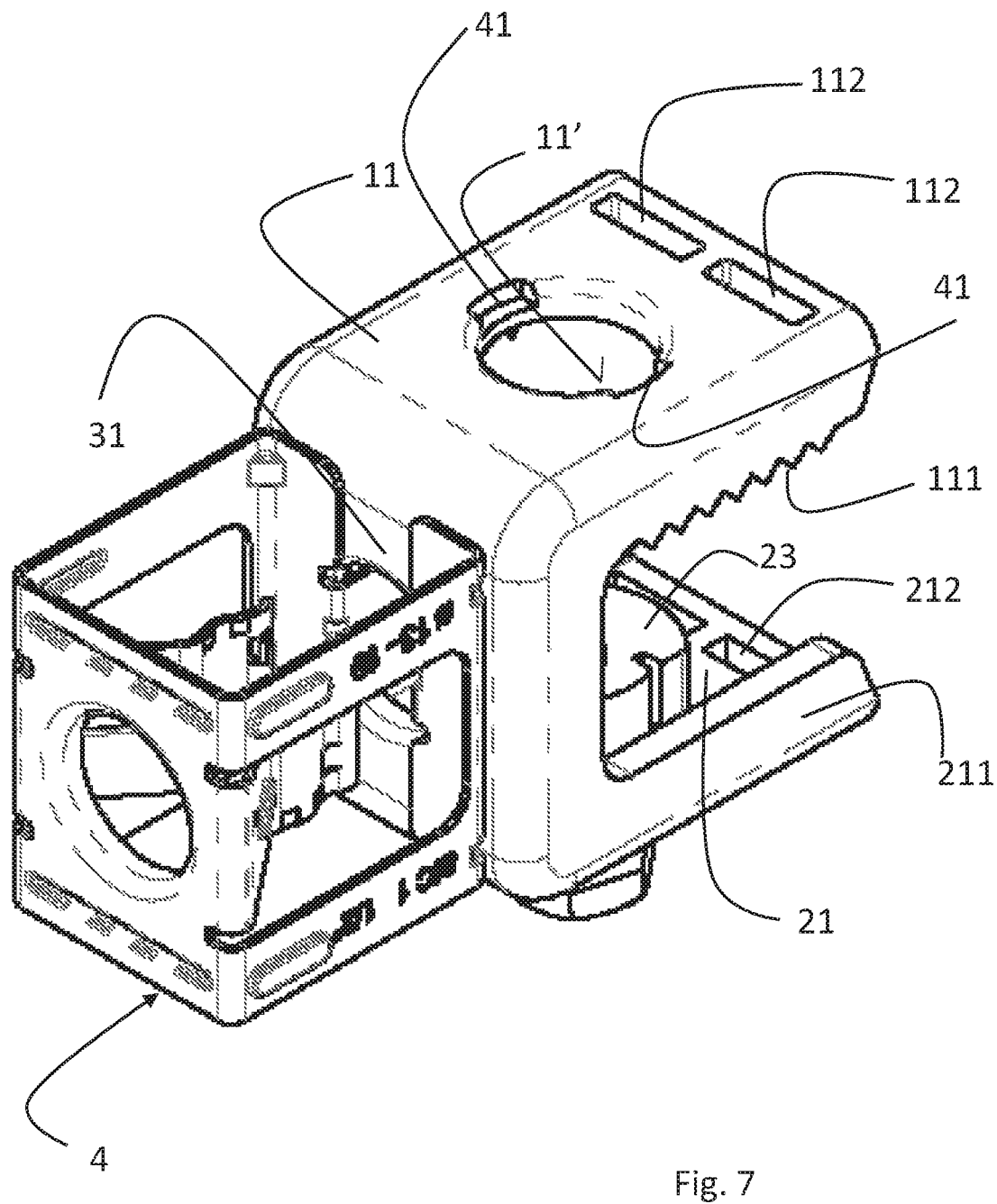

A further insert or adapter 2 can be inserted in the other holes of the clamp 1 or the hole of the wing having a folded section with a notched profile and/or the hole 31' of the core 31, as illustrated for example in FIG. 8*b*, which can be used for screwing the threaded rod 6' connecting a pair of saddles 3, as shown in FIG. 9, or said holes can be used, without the insert 2, for the insertion of collars 4, as shown in FIGS. 7, 10, 11.

The cable seats can therefore be fixed either to at least one of the wings 11, 21 of the clamp 1 or to the core 31.

According to the present invention, the clamp 1 is made of plastic material reinforced with glass fibers.

From what is described above with reference to the figures, it is evident that a clamp 1 according to the present invention is particularly useful and advantageous.

The objectives mentioned in the preamble of the description have thus been achieved.

In particular, the clamp 1 made of plastic material reinforced with glass fibers has a resistance comparable to that of metal clamps with the advantage of reducing the effect of PIM on the signals transmitted by the cables.

The clamp 1 in plastic material reinforced with glass fibers is sturdy, long-lasting and guarantees easy and firm assembly on any type of support 5.

Furthermore, the clamp 1 according to the present invention guarantees resistance similar to the known metal clamps but with the advantage of having a greater resistance to atmospheric agents and greater ease of assembly and disassembly, thanks to the fact that the material of which they are composed cannot be corroded.

Furthermore, the clamp 1 object of the present invention can be easily produced in series.

The protection scope of the invention is thus defined by the enclosed claims.

The invention claimed is:

1. A clamp configured to mount cables to a support, the clamp comprising:
   a jumper having a "C"-shaped cross-section defined by two opposite wings interconnected by a segment extending perpendicularly between the two opposing wings, the two opposite wings and the segment being provided with respective pass-through holes, and
   an insert or adapter having a threaded pass-through hole and configured to be engaged in one of the respective pass-through holes,
   wherein the insert or adapter having the threaded pass-through hole comprises,
      a substantially rectangular base section with straight sides and arched sides shorter than the straight sides, and
      a bush section extending from the base section; and
   elastically yielding teeth extending from the straight sides of the base section toward the bush section, the elastically yielding teeth being snap-engaged in undercuts of the one of the respective pass-through holes.

2. The clamp according to claim 1, wherein, in an assembled condition of the insert or adapter in one of the respective pass-through holes, the base section is abutted against an inner surface of the jumper having the "C"-shaped cross-section and the bush section is at least partially inserted in the one of the respective pass-through holes.

3. A clamp configured to mount cables to a support, the clamp comprising:
   a jumper having a "C"-shaped cross-section defined by two opposite wings interconnected by a segment extending perpendicularly between the two opposing wings, the two opposite wings and the segment being provided with respective pass-through holes, and
   an insert or adapter having a threaded pass-through hole and configured to be engaged in one of the respective pass-through holes,
   wherein the insert or adapter having the threaded pass-through hole comprises,
      a substantially rectangular base section with straight sides and arched sides shorter than the straight sides, and
      a bush section extending from the base section; and
   wherein at least one of the arched sides of the base section is provided with at least one longitudinal recess, which extends for at least part of the at least one of the arched sides toward the bush section, further comprising at least one rib provided on an inner face of at least one of the two opposite wings or the segment in proximity of a pass-through hole defined therein, the at least one rib engaging the at least one longitudinal recess so as to prevent the insert or adapter from rotating with respect to the clamp.

4. The clamp according to claim 1, wherein the threaded pass-through hole of the insert or adapter engaged in the one of the respective pass-through holes provided on the wings is tilted, causing an axis passing through the threaded pass-through hole to be not perpendicular to an axis passing through a pass-through hole provided on the segment.

5. The clamp according to claim 1, wherein one or both of the two opposite wings is provided with first sections that are folded, from an edge of one or both of the two opposite wings at 90°, towards an inside of the "C"-shaped cross-section of the clamp.

6. The clamp according to claim 5, wherein the sections are interconnected by second sections of the segment folded, from a side edge of the segment, at 90°, towards the inside of the "C"-shaped cross-section of the clamp.

7. The clamp according to claim 1, further comprising connection ribs of the two opposite wings with the segment, the connection ribs being provided on an inner surface of the wings and of the segment.

8. The clamp according to claim 1, further comprising a screw configured to be screwed into the threaded hole of the insert or adapter when coupled to one of the two opposite wings, the screw having an end of the screw adapted to be brought into contact with a plate-shaped support inserted in the jumper so as to fix the clamp to the plate-shaped support.

9. The clamp according to claim 8, wherein the end of the screw adapted to come into contact with a plate-shaped support is covered with plastic or has a cap made of a plastic material.

10. The clamp according to claim 1, wherein a profile of the first sections of one or both of the two opposite wings is indented.

11. The clamp according to claim 1, wherein the two opposite wings have one or more slots configured for passage of cable ties fixing the clamp onto a tubular support inserted in the jumper.

12. The clamp according to claim 1, wherein at least one of the respective pass-through holes is configured to receive coupling elements of a supporting collar for cables, tubes or other tubular elements inserted therein.

13. The clamp according to claim 1, wherein the insert or adapter is coupled to one of the respective pass-through holes and the threaded pass-through hole of the insert or adapter receives a threaded bar of a bolt screwed therein, so as to fix seats or saddles for passage of cables.

14. The clamp according to claim 1, wherein the clamp and the insert or adapter is made of a plastic material reinforced with glass fibers.

15. The clamp according to claim 3, wherein the threaded pass-through hole of the insert or adapter engaged in the one of the respective pass-through holes provided on the wings is tilted, causing an axis passing through the threaded pass-through hole to be not perpendicular to an axis passing through a pass-through hole provided on the segment.

16. The clamp according to claim 3, further comprising connection ribs of the two opposite wings with the segment, the connection ribs being provided on an inner surface of the wings and of the segment.

17. The clamp according to claim 3, further comprising a screw configured to be screwed into the threaded hole of the insert or adapter when coupled to one of the two opposite wings, the screw having an end of the screw adapted to be brought into contact with a plate-shaped support inserted in the jumper so as to fix the clamp to the plate-shaped support.

18. The clamp according to claim 17, wherein the end of the screw adapted to come into contact with a plate-shaped support is covered with plastic or has a cap made of a plastic material.

19. The clamp according to claim 3, wherein a profile of the first sections of one or both of the two opposite wings is indented.

20. The clamp according to claim 3, wherein the insert or adapter is coupled to one of the respective pass-through holes and the threaded pass-through hole of the insert or adapter receives a threaded bar of a bolt screwed therein, so as to fix seats or saddles for passage of cables.

\* \* \* \* \*